United States Patent
Groepl et al.

(10) Patent No.: US 8,824,898 B2
(45) Date of Patent: Sep. 2, 2014

(54) CIRCUIT ARRANGEMENT AND METHOD FOR TRANSMITTING TMDS ENCODED SIGNALS

(75) Inventors: Martin Groepl, Sonthofen/Oberallgaeu (DE); Holger Hoeltke, Munich (DE)

(73) Assignee: SILICON LINE GmbH, München (DE)

( * ) Notice: Subject to any disclaimer, the term of this patent is extended or adjusted under 35 U.S.C. 154(b) by 291 days.

(21) Appl. No.: 13/083,282

(22) Filed: Apr. 8, 2011

(65) Prior Publication Data

US 2011/0268451 A1    Nov. 3, 2011

Related U.S. Application Data

(63) Continuation of application No. PCT/EP2009/063131, filed on Oct. 9, 2009.

(30) Foreign Application Priority Data

Oct. 9, 2008 (DE) .......................... 10 2008 042 724
Sep. 22, 2009 (DE) .......................... 10 2009 029 683

(51) Int. Cl.
*H04B 10/12* (2006.01)
(52) U.S. Cl.
USPC ........... 398/141; 398/182; 398/183; 398/192; 398/193; 398/194; 398/202; 398/208; 398/135; 398/136; 370/276; 370/464; 370/252; 385/89; 385/90; 385/92; 385/93
(58) Field of Classification Search
USPC ......... 398/140, 141, 158, 159, 164, 135, 136, 398/137, 138, 139, 182, 183, 185, 186, 187, 398/201, 202, 208, 209, 214, 192, 193, 194, 398/200; 370/276, 464, 252, 227, 225; 385/100, 88, 89, 90, 92, 93, 53, 55
See application file for complete search history.

(56) References Cited

U.S. PATENT DOCUMENTS 5,012,384 A    4/1991    Chew
5,019,769 A    5/1991    Levinson
(Continued)

FOREIGN PATENT DOCUMENTS

DE    10 2004 032456 B3    4/2006
EP    0 798 828 A    10/1997
(Continued)

OTHER PUBLICATIONS

PCT International Search Report in application No. PCT/EP2009/063131, dated Mar. 29, 2010 (6 pages).
(Continued)

*Primary Examiner* — Hanh Phan
(74) *Attorney, Agent, or Firm* — Shlesinger, Arkwright & Garvey LLP (57) ABSTRACT

For providing circuit arrangement and method for transmitting signals from a data source to a data sink, the signals being TMDS encoded, the driver circuit is supplied by a connection interface, connected upstream, assigned to data source, with supply voltage, electrical TMDS encoded signals are electro-optically converted by an LED connected downstream of the driver circuit and coupled into an optical fiber as light supplied with TMDS encoded signals, the direct current portion supplied from TMDS transmitter to connection interface, to data source, is converted by driver circuit to a modulated signal current for controlling LED. Light supplied with TMDS encoded signals decoupled out from optical fiber by light-absorbing element, opto-electrically converted and supplied to transimpedance converter circuit connected downstream of light-absorbing element and upstream of connection interface assigned to data sink, transimpedance converter circuit being supplied by direct voltage portion being applied to differential pair of wires.

17 Claims, 5 Drawing Sheets

(56) References Cited

U.S. PATENT DOCUMENTS

| | | |
|---|---|---|
| 5,672,994 A | 9/1997 | Au et al. |
| 5,834,813 A | 11/1998 | Ma et al. |
| 5,949,253 A | 9/1999 | Bridgewater, Jr. |
| 6,031,855 A | 2/2000 | Watanabe |
| 6,650,143 B1 | 11/2003 | Peng |
| 6,667,661 B1 | 12/2003 | Liu et al. |
| 6,812,733 B1 | 11/2004 | Plasterer et al. |
| 6,965,722 B1 | 11/2005 | Nguyen |
| 6,975,135 B1 | 12/2005 | Bui |
| 6,990,130 B2 | 1/2006 | Sato et al. |
| 7,133,429 B2 | 11/2006 | Moran |
| 7,154,923 B2 | 12/2006 | Kucharski |
| 7,173,851 B1 | 2/2007 | Callahan et al. |
| 7,272,067 B1 | 9/2007 | Huang et al. |
| 7,280,425 B2 | 10/2007 | Keshavarzi et al. |
| 7,595,661 B2 | 9/2009 | Kim |
| 7,602,739 B2 * | 10/2009 | Weigert .................. 370/276 |
| 8,194,431 B2 | 6/2012 | Groepl et al. |
| 8,258,813 B2 | 9/2012 | Groepl et al. |
| 8,260,148 B2 * | 9/2012 | Cunneen et al. ............ 398/141 |
| 2001/0043093 A1 | 11/2001 | Sakura et al. |
| 2002/0117724 A1 | 8/2002 | Ariyoshi et al. |
| 2003/0058725 A1 | 3/2003 | Bell |
| 2003/0094977 A1 | 5/2003 | Li et al. |
| 2004/0101007 A1 | 5/2004 | Bozso et al. |
| 2004/0160996 A1 | 8/2004 | Giorgi et al. |
| 2004/0195978 A1 | 10/2004 | Horiuchi et al. |
| 2004/0208011 A1 | 10/2004 | Horiuchi et al. |
| 2005/0185428 A1 | 8/2005 | Crawford et al. |
| 2005/0259703 A1 | 11/2005 | You et al. |
| 2006/0077778 A1 * | 4/2006 | Tatum et al. ............... 369/44.11 |
| 2006/0133435 A1 | 6/2006 | Ikeda |
| 2006/0147214 A1 | 7/2006 | Ruiz et al. |
| 2006/0216034 A1 | 9/2006 | Miller et al. |
| 2007/0159434 A1 | 7/2007 | Yen et al. |
| 2007/0291807 A1 | 12/2007 | Uesaka |
| 2008/0007985 A1 | 1/2008 | Wilcox |
| 2008/0012507 A1 | 1/2008 | Nalbant |
| 2008/0154103 A1 | 6/2008 | LeMay |
| 2008/0304527 A1 | 12/2008 | Gao et al. |
| 2010/0109794 A1 | 5/2010 | Groepl et al. |
| 2010/0172384 A1 | 7/2010 | Groepl et al. |
| 2010/0172385 A1 | 7/2010 | Groepl et al. |
| 2011/0080765 A1 | 4/2011 | Groepl et al. |
| 2011/0121742 A1 | 5/2011 | Groepl et al. |

FOREIGN PATENT DOCUMENTS

| | | |
|---|---|---|
| EP | 1 777 708 A1 | 4/2007 |
| EP | 1 956 493 A1 | 8/2008 |
| FR | 2 889 643 A | 2/2007 |
| GB | 2 365 788 A | 2/2002 |
| WO | WO2007/027948 A2 | 3/2007 |
| WO | WO2007/069104 A | 6/2007 |
| WO | WO2008/050779 A | 5/2008 |

OTHER PUBLICATIONS

HDMI (High-Definition Multimedia Interface Specification) Version 1.3a Hitachi, Ltd., et al., Nov. 10, 2006, (note p. 38 et seq.) (276 pages).

* cited by examiner

CIRCUIT ARRANGEMENT AND METHOD FOR TRANSMITTING TMDS ENCODED SIGNALS

CROSS-REFERENCE TO RELATED APPLICATIONS

This application is a continuation of application no. PCT/EP2009/063131, filed 9 Oct. 2009, which claims the priority of German application no. 10 2008 042 724.1, filed 9 Oct. 2008, and which application no. PCT/EP2009/063131, filed 9 Oct. 2009, claims the priority of German application no. 10 2009 029 683.2, filed 22 Sep. 2009, and each of which is incorporated herein by reference.

FIELD OF THE INVENTION

The present invention relates to a circuit arrangement for transmitting signals from at least one data source to at least one data sink, said signals being TMDS encoded at least in part, in particular at least in a time slot manner, and in particular being assigned to at least one DVI data connection and/or to at least one HDMI data connection (DVI=Digital Visual Interface; HDMI=High Definition Multimedia Interface; TMDS=Transition-Minimized Differential Signaling).

The present invention further relates to a method for transmitting signals from at least one data source to at least one data sink, said signals being TMDS encoded at least in part, in particular at least in a time slot manner, and in particular being assigned to at least one DVI data connection and/or to at least one HDMI data connection.

BACKGROUND OF THE INVENTION

Visual display units, (flat) screens, displays, television sets and monitors with high resolution comprise an electrical connection interface, in particular in form of a DVI data transmitting interface and/or HDMI data transmitting interface. In addition to various control signals, several differential TMDS encoded signals for the transmission of audio and video data as well as the required clock signal between at least one data source and at least one data sink are carried via this interface.

In this connection, TMDS (=Transition-Minimized Differential Signaling) is basically a digital transmission standard for uncompressed multimedia data, having been developed to eliminate electromagnetic disturbances occurring at analogue transmission; in this way, TMDS is used for instance at DVI transmissions (DVI=Digital Visual Interface) and/or at HDMI transmissions (HDMI=High Definition Multimedia Interface) in order to control screens with very high resolution, wherein TMDS encoded signals may comprise data rates in the region of several gigabits per second.

According to page 38 of version 1.3a of the HDMI specification dated 10 Nov. 2006 (participating companies: Hitachi Ltd., Matsushita Electric Industrial Co. Ltd., Philips Consumer Electronics International B.V., Silicon Image Inc., Sony Corporation, Thomson Inc., Toshiba Corporation), the TMDS technology uses a current driver in order to generate a differential low voltage signal on the sink side of a direct current coupled transmission line.

The termination voltage or supply voltage defines the upper voltage value for each of both terminals of the differential signal whereas the lower voltage value is determined by the current source of the HDMI source and by the terminating resistor at the sink. The terminating resistor and the characteristic impedance of the cable are to be adapted to each other.

Figure 3:
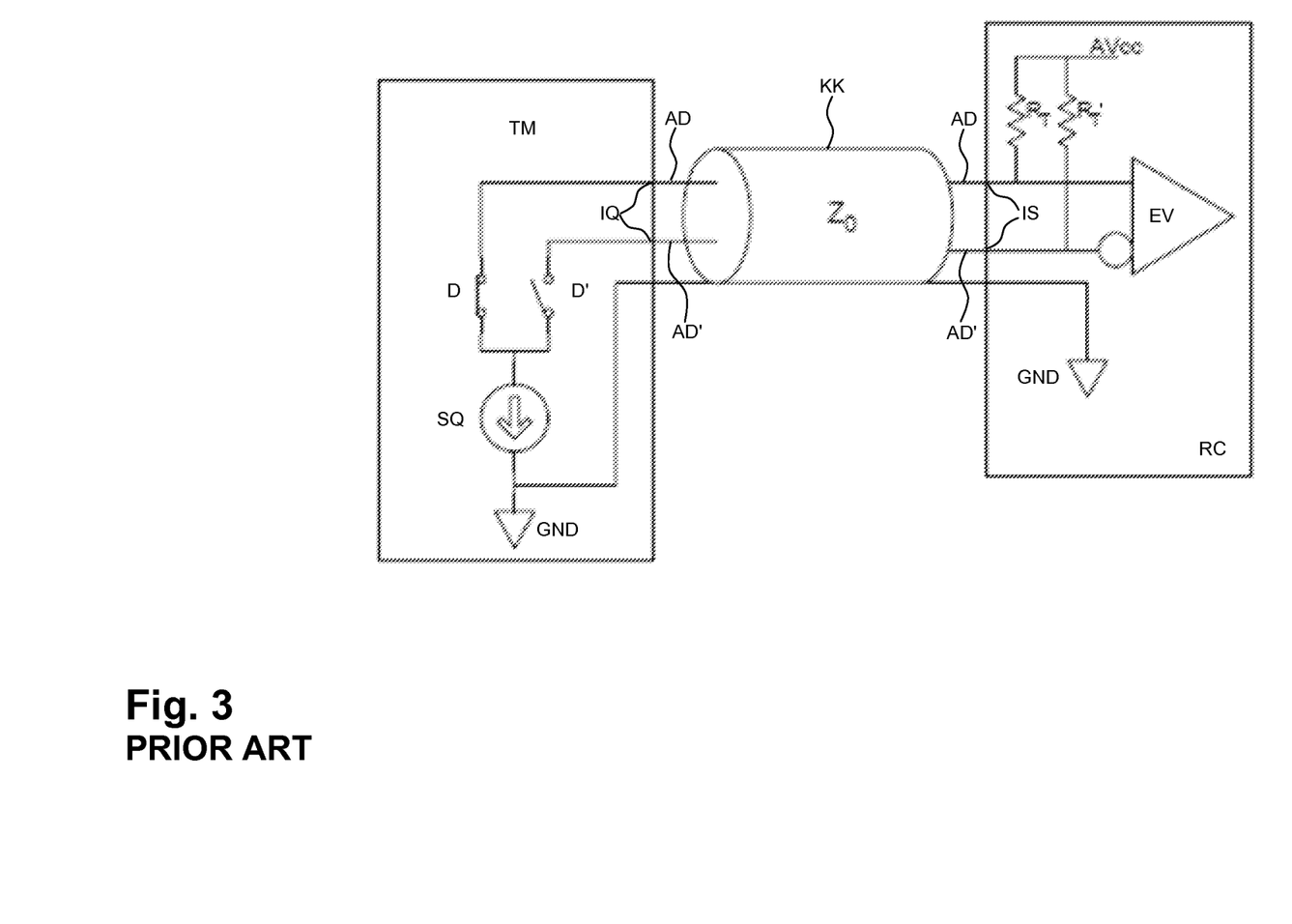
FIG. 3 in a conceptual schematic view an example of a prior art circuit arrangement.

In detail, the electrical connection is effected between the connection interface of the data source and the connection interface of the data sink, for example by means of a copper cable KK (with impedance Z0 per differential pair of copper wires; cf. FIG. 3). The TMDS encoded signals are provided as output current signal from the data source by means of an output current driver (transmitter TM with current source SQ and changeover switch D, D'; cf. FIG. 3).

The correct line termination in the receiver (receiver RC; cf. FIG. 3) is effected by the direct voltage coupled transmission channel KK between the data source and the data sink. At this line termination in form of two ohmic resistors RT, RT' connected in parallel (cf. FIG. 3) in the receiver RC, the input signal voltage necessary for the input amplifier EV is generated with reference to the supply voltage AVCC.

FIG. 3 shows the above-described with regard to the prior art in form of a conceptual schematic circuit diagram for a differential TMDS signal wherein it can be further taken from FIG. 3 that the receiver RC adopts the direct voltage supply of the output current driver of the transmitter TM. In addition, the connection interface of the data source provides a voltage supply in the order of about five volt for the data sink, wherein said voltage supply may be loaded with not more than about 55 milliampere.

As to the depicted prior art, it has to be considered that TMDS encoded signals of an HDMI data connection are to be able to support data transmission rates of several gigabits per second and per differential pair of wires AD, AD' (cf. FIG. 3) of the copper cable KK. This involves that highest-quality and thus expensive copper cables are to be used in case of longer distances between data source and data sink.

OBJECTS AND SUMMARY OF THE INVENTION

Starting from the above-explained disadvantages and inadequacies and in consideration of the prior art outlined, the object of the present invention is to provide a circuit arrangement and a method for inexpensively transmitting signals from at least one data source to at least one data sink, said signals being TMDS encoded at least in part, in particular at least in a time slot manner, and in particular being assigned to at least one DVI data connection and/or to at least one HDMI data connection.

This object is achieved by a circuit arrangement according to the invention with the herein described features and by a method according to the invention with the herein described features. Advantageous embodiments and expedient developments of the present invention are described above and below.

This object is achieved by a circuit arrangement for transmitting signals from at least one data source to at least one data sink, said signals being TMDS encoded at least in part, in particular at least in a time slot manner, and in particular being assigned to at least one DVI data connection and/or to at least one HDMI data connection, wherein said circuit arrangement comprises:

at least one driver circuit
being connected downstream of at least one connection interface, which is assigned to the data source, and being suppliable by said connection interface with a supply voltage, for example in the order of about five volt, said supply voltage in particular being able to supply up to about 55 milliampere, and
being connected upstream of at least one light-emitting element, in particular of at least one light diode, of at least one light-emitting diode, of at least one laser diode or of at least one laser, for example of at least one semiconductor laser, said light-emitting element being provided for electro-optically converting the electrical TMDS encoded signals, wherein light being supplied with the TMDS encoded signals is coupleable into at least one optical fiber, in particular into at least one glass fiber or into at least one plastic material fiber, for example into at least one plastic fiber, by means of said light-emitting element, and/or at least one transimpedance converter circuit
being connected downstream of at least one light-absorbing element, in particular of at least one photodiode, said light-absorbing element being provided for opto-electrically converting the light being supplied with the TMDS encoded signals, wherein the light being supplied with the TMDS encoded signals is coupleable out from the optical fiber by means of said light-absorbing element,
being connected upstream of at least one connection interface being assigned to the data sink, and
being suppliable by a direct voltage portion being applied to at least one differential pair of wires.

This object is further achieved by an embodiment of the circuit arrangement according to the invention, wherein the driver circuit comprises at least one voltage increasing circuit, in particular being implemented as voltage doubler and/or in particular operating as direct voltage converter, by means of which voltage increasing circuit electrical energy, in particular electrical power, can be taken and/or given from a potential difference or voltage difference, in particular providable by means of at least one voltage-limiting element, for example by means of at least one parallel voltage regulator or shunt regulator, or termination voltage, in particular providable by means of at least one voltage regulating element or voltage regulator.

This object is further achieved by an embodiment of the circuit arrangement according to the invention, wherein the electrical energy can be taken in that the voltage increasing circuit charges the potential difference or voltage difference or the termination voltage with current flowing, in particular being directed such that the current tries to reduce the potential difference or voltage difference or the termination voltage, and/or can be given in that the voltage increasing circuit supplies a higher potential difference or voltage difference between the reference terminal of the voltage increasing circuit and the potential or the voltage of the output terminal of the voltage increasing circuit with current flowing, in particular being directed such that the current tries to increase the higher potential difference or voltage difference, wherein the light-emitting element is operated with said higher potential difference or voltage difference.

This object is further achieved by an embodiment of the circuit arrangement according to the invention, wherein the driver circuit comprises at least one amplifier circuit, in particular at least one input amplifier, and at least one switching transistor for modulating the current flowing through the light-emitting element, in particular in dependence on the differential output signal of at least one TMDS transmitters of the connection interface being assigned to the data source, wherein the gate or the base of the switching transistor is connected with the output terminal of the amplifier circuit,
wherein the drain or the collector of the switching transistor is assigned to the supply voltage, in particular with the drain or the collector of the switching transistor lying essentially on supply voltage,
wherein the source or the emitter of the switching transistor is connected with the input terminal of the light-emitting element.

This object is further achieved by an embodiment of the circuit arrangement according to the invention, wherein the driver circuit comprises at least one second switching transistor, in particular being implemented as source follower, wherein the gate or the base of the second switching transistor is assigned to the supply voltage, in particular with the gate or the base of the second switching transistor being adjustable slightly differing from the supply voltage,
wherein the drain or the collector of the second switching transistor is assigned to the supply voltage, in particular with the drain or the collector of the second switching transistor lying essentially on supply voltage,
wherein the source or the emitter of the second switching transistor is connected with the source or the emitter of the first switching transistor and with the input terminal of the light-emitting element.

This object is further achieved by an embodiment of the circuit arrangement according to the invention, wherein, for at least partially terminating the differential pair of wires, the driver circuit comprises at least one first terminating resistor being connected between the input terminal of the voltage-limiting element or of the voltage regulating element or voltage regulator and a first input terminal of the amplifier circuit, and
at least one second terminating resistor being connected between the input terminal of the voltage-limiting element or of the voltage regulating element or voltage regulator and a second input terminal of the amplifier circuit by means of which terminating resistors the TMDS transmitter can be supplied with the difference between potential difference or voltage difference and supply voltage or with the termination voltage, in order to adjust the operating point of the output stage of the TMDS transmitter.

This object is further achieved by an embodiment of the circuit arrangement according to the invention, wherein, in particular in case of at least one galvanic connection between the data source and the data sink, the TMDS transmitter is terminable by means of at least one TMDS receiver, which is assigned to the connection interface being assigned to the data sink, with the transimpedance converter circuit being connected to the differential input of the TMDS receiver,
the transimpedance converter circuit, in particular in case of at least one galvanic connection between the data source and the data sink, is suppliable by means of at least two terminating resistors of the TMDS receiver with an operating voltage, for example in the order of about 3.3 volt, said operating voltage in particular being able to supply up to about twelve milliampere per differential input, and/or
an operating voltage is suppliable to the TMDS transmitter, in particular to the output stage of the TMDS transmitter, via the differential pair of wires.

This object is further achieved by an embodiment of the circuit arrangement according to the invention, wherein the transimpedance converter circuit comprises at least one amplifier, the differential input of which is assigned to the light-absorbing element, and at least one first coupling capacitor being assigned to the first output of the amplifier, and at least one second coupling capacitor being assigned to the second output of the amplifier, for charging the differential input of the TMDS receiver with the TMDS encoded signals being taken up from the light-absorbing element and being amplified by means of the amplifier.

This object is further achieved by an embodiment of the circuit arrangement according to the invention,
  wherein, for at least partially terminating the differential pair of wires, the transimpedance converter circuit comprises
  at least one first resistor, in particular at least one first terminating resistor, and
  at least one second resistor, in particular at least one second terminating resistor,
by means of which resistors the operating point of the input stage of the TMDS receiver can be adjusted by means of generating a common mode voltage for the TMDS receiver from the operating voltage, and
  wherein the supply current, feeding the supply voltage, flows at least partially via the first resistor and/or via the first resistor from the differential pair of wires to the amplifier.

This object is further achieved by an embodiment of the circuit arrangement according to the invention, wherein the transimpedance converter circuit comprises
  at least one amplifier, the differential input of which is assigned to the light-absorbing element, and
  at least one first switching transistor being assigned to the first output of the amplifier, and at least one second switching transistor being assigned to the second output of the amplifier, for charging the differential input of the TMDS receiver with the TMDS encoded signals being taken up from the light-absorbing element and being amplified by means of the amplifier, wherein the supply current of the amplifier, feeding the supply voltage, is at least partially the current flowing through the switching transistors.

This object is further achieved by an embodiment of the circuit arrangement according to the invention, wherein, for at least partially terminating the differential pair of wires, the transimpedance converter circuit comprises
  at least one first resistor, in particular at least one first terminating resistor, and
  at least one second resistor, in particular at least one second terminating resistor, by means of which resistors the operating point of the input stage of the TMDS receiver can be adjusted by means of generating a common mode voltage for the TMDS receiver from the operating voltage.

This object is achieved by a method for transmitting signals from at least one data source to at least one data sink, said signals being TMDS encoded at least in part, in particular at least in a time slot manner, and in particular being assigned to at least one DVI data connection and/or to at least one HDMI data connection,
  wherein the driver circuit is supplied by at least one connection interface, which is connected upstream and which is assigned to the data source, with a supply voltage, for example in the order of about five volt, said supply voltage in particular being able to supply up to about 55 milliampere,
  wherein the electrical TMDS encoded signals are electro-optically converted by means of at least one light-emitting element connected downstream of the driver circuit, in particular by means of at least one light diode, by means of at least one light-emitting diode, by means of at least one laser diode or by means of at least one laser, for example by means of at least one semiconductor laser, and are coupled into at least one optical fiber, in particular into at least one glass fiber or into at least one plastic material fiber, for example into at least one plastic fiber, as light being supplied with the TMDS encoded signals,
  wherein the direct current portion supplied from at least one TMDS transmitter to the connection interface, which is assigned to the data source, is converted by means of the driver circuit to a modulated signal current for controlling the light-emitting element,
  wherein the light being supplied with the TMDS encoded signals is coupled out from the optical fiber by means of at least one light-absorbing element, in particular by means of at least one photodiode, is opto-electrically converted and is supplied to at least one transimpedance converter circuit, which is connected downstream of the light-absorbing element and upstream of at least one connection interface being assigned to the data sink, the transimpedance converter circuit being supplied by a direct voltage portion being applied to at least one differential pair of wires.

This object is further achieved by an embodiment of the method according to the invention, wherein electrical energy, in particular electrical power, for operating the transimpedance converter circuit is taken from that electrical energy, in particular from that electrical power, which is the product of the direct current portion in the connection between the transimpedance converter circuit and at least one TMDS receiver, which is assigned to the connection interface being assigned to the data sink, and of the direct voltage portion at the TMDS receiver.

This object is further achieved by an embodiment of the method according to the invention, wherein, in particular in case of at least one galvanic connection between the data source and the data sink,
  the TMDS transmitter is terminated by means of at least one TMDS receiver of the connection interface being assigned to the data sink,
  an operating voltage is supplied to the TMDS transmitter, in particular to the output stage of the TMDS transmitter, via the differential pair of wires between the data source and the data sink,
  the driver circuit is supplied by the connection interface, which is assigned to the data source, with a supply voltage, for example in the order of about five volt, said supply voltage in particular being able to supply up to about 55 milliampere,
  the transimpedance converter circuit is supplied by means of at least two terminating resistors of the TMDS receiver with an operating voltage, for example in the order of about 3.3 volt, said operating voltage in particular being able to supply up to about twelve milliampere per differential input.

This object is further achieved by a use of the circuit arrangement and/or of the method according to the invention for the signal connection, in particular in at least one cable connection, for example in at least one active optical transmission cable, between at least one HDTV data source, for example at least one Blu-ray player, and at least one HDTV data sink, for example at least one flat screen with very high resolution.

Using the circuit arrangement and the circuit technology according to the present invention, at least one cable-based connection can be implemented without the necessity of any further electrical supply—apart from the electrical supply anyway already present at the electrical contacts.

More specifically, by means of the circuit arrangement according to the present invention and by means of the method according to the present invention, signals being TMDS encoded at least in part, in particular at least in a time slot manner, can be transported by way of optical signal transmission from at least one data source to at least one data sink, in particular on the basis of at least one DVI data connection and/or of at least one HDMI data connection.

In this connection, the optical signal transmission via glass fiber or via plastic material fiber, such as via plastic fiber, represents a price-efficient alternative to high-quality expensive copper cables (, with said optical signal transmission causing a conversion of the electrical signal into an optical signal by means of at least one electro-optical converter and vice versa by means of at least one opto-electrical converter).

A person skilled in the art of the present technical field, for example a specialist engineer of communications engineering with deepened knowledge in the multimedia field, will appreciate with regard to the present invention in particular the dispensability of an additional external current supply; this means that, according to the invention, the supply of the at least one driver circuit or of the at least one transimpedance converter circuit is effected exclusively by means of the voltages and currents provided at the connection interfaces, in particular at the DVI transmission interfaces or at the HDMI transmission interfaces, of the data source and of the data sink. The present invention thus makes use of the fact that the current supply of the at least one driver circuit or of the at least one transimpedance converter circuit does not result from a (or even several) additional external current supply source(s) but can rather be provided by the connection interfaces of the data source or of the data sink.

This is particularly advantageous in terms of the present invention because external current supply sources turn out to be technically intricate in the field of consumer electronics and involve a considerable disadvantage as to sale. Compared to the circuit arrangement as presented within the scope of the present invention, other circuit arrangements are typically not operable due to limited electrical power available.

The circuit arrangement with the at least one driver circuit according to the present invention and with the at least one transimpedance converter circuit according to the present invention represents a possibility to optically transmit the TMDS signals provided by the connection interface of the data source, without requiring an additional external current supply therefor.

Due to the fact that TMDS encoded signals can comprise data rates in the region of several gigabits per second, the optical transmission, as enabled by means of the present invention, of such TMDS encoded signals via optical fibers permits the buildup of inexpensive signal connections, which do not emit electromagnetic radiation and which can transport high data rates with low attenuation from the data source to the data sink. The advantages due to the presently optical transmission have an effect in particular for cable lengths of more than about three meters.

Because of the driver circuit according to the present invention being connected between the TMDS transmitter and the light-emitting element, it is ensured in a particularly expedient way that the direct current portion, as provided from the TMDS transmitter, is used for the energy supply of the light-emitting element; in contrast, the alternating current portion, as provided from the TMDS transmitter, is used for the modulation of the current flow conducted through the light-emitting element.

In this way, by means of the driver circuit acting as a direct current to direct current converter (DC to DC converter), the direct current portion, as provided from the TMDS transmitter, is converted in effect into a modulated signal current for controlling the light-emitting element, meaning a transfer of the energy (power), as provided by the TMDS transmitter, to the light-emitting element.

The transferred power is approximately the product of the flowing direct current portion and of the voltage difference between the node voltage at the output of the TMDS transmitter and the voltage supply in the order of about five volt, said voltage supply being also available at the TMDS interface.

According to the invention, the transimpedance converter circuit is supplied by a direct voltage portion being applied to the differential pair of wires.

The present invention further relates to a cable connection for transmitting signals from at least one data source to at least one data sink, said signals being TMDS encoded at least in part, in particular at least in a time slot manner, and in particular being assigned to at least one DVI data connection and/or to at least one HDMI data connection, comprising at least one circuit arrangement according to the above-mentioned type.

According to the invention, the provision of at least one such active optical transmission cable is based on the fact that the circuit arrangement, i.e. the at least one driver circuit and/or the at least one transimpedance converter circuit can be implemented in a very compact way, namely without external current supply, such that the driver and/or the transimpedance converter can be integrated in a commercial, in particular conventional or regular, DVI connector and/or HDMI connector.

The present invention finally relates to the use of at least one circuit arrangement according to the above-mentioned type and/or of a method according to the above-mentioned type for the signal connection, in particular in at least one cable connection, for example in at least one active optical transmission cable, between at least one HDTV data source, for example at least one Blu-ray player, and at least one HDTV data sink, for example at least one flat screen with very high resolution.

BRIEF DESCRIPTION OF THE DRAWINGS

As already discussed above, there are various possibilities for embodying and further developing the teaching of the present invention in an advantageous manner. For this purpose, on the one hand reference is made to the above explanations and to the dependent claims, and on the other hand further embodiments, features and advantages of the present invention are explained in greater detail below, inter alia by way of the exemplary embodiments illustrated by FIG. 1A to FIG. 2B.

It is shown in.

Like or similar embodiments, elements or features are provided with identical reference numerals in FIG. 1A to FIG. 3.

DETAILED DESCRIPTION OF THE INVENTION

Figure 1A:
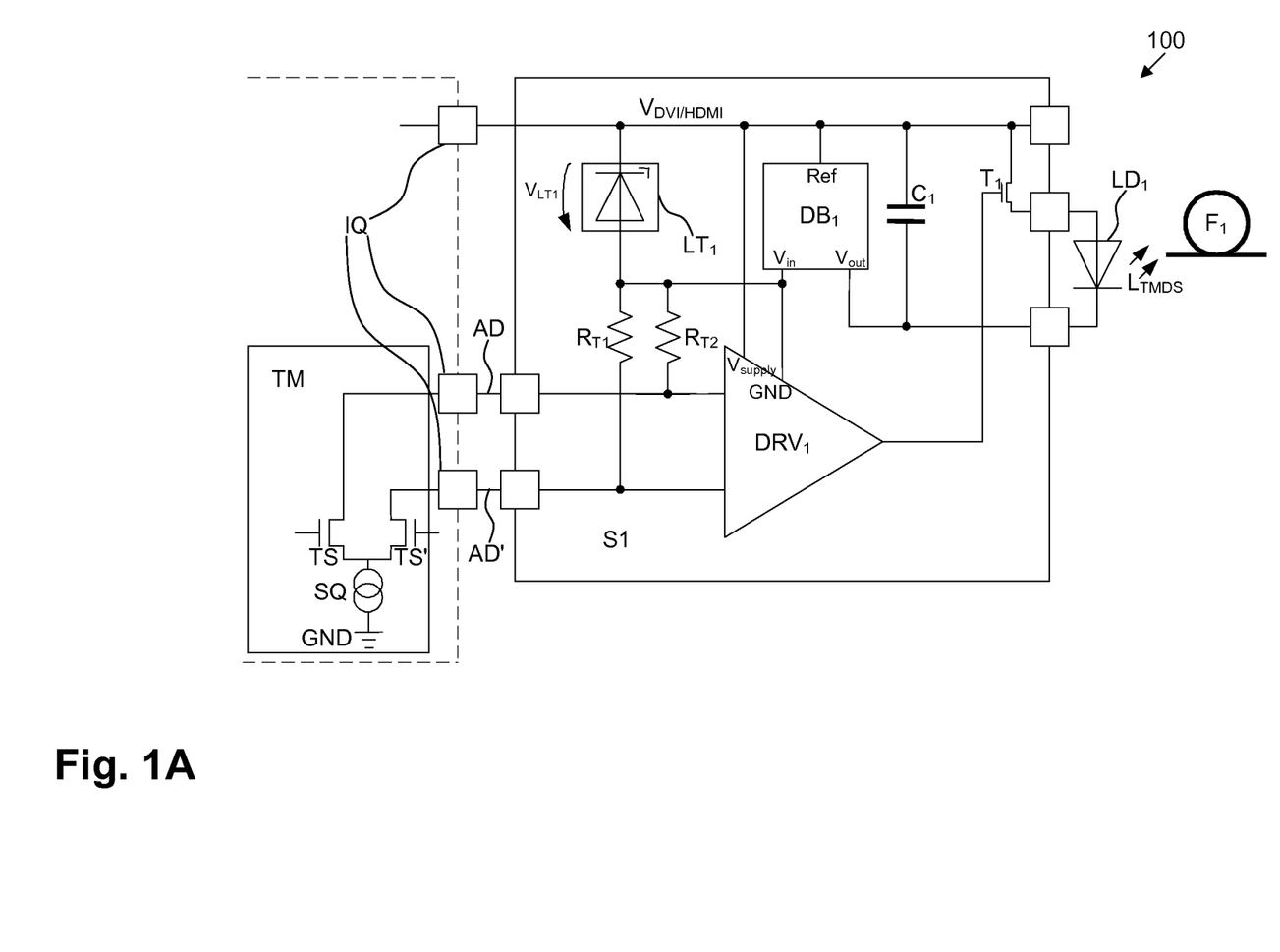
FIG. 1A in a conceptual schematic view a first exemplary embodiment of the first part, namely of the driver part, being implemented according to the present invention, of a circuit arrangement, wherein said driver part is operated according to the method of the present invention.
Figure 1B:
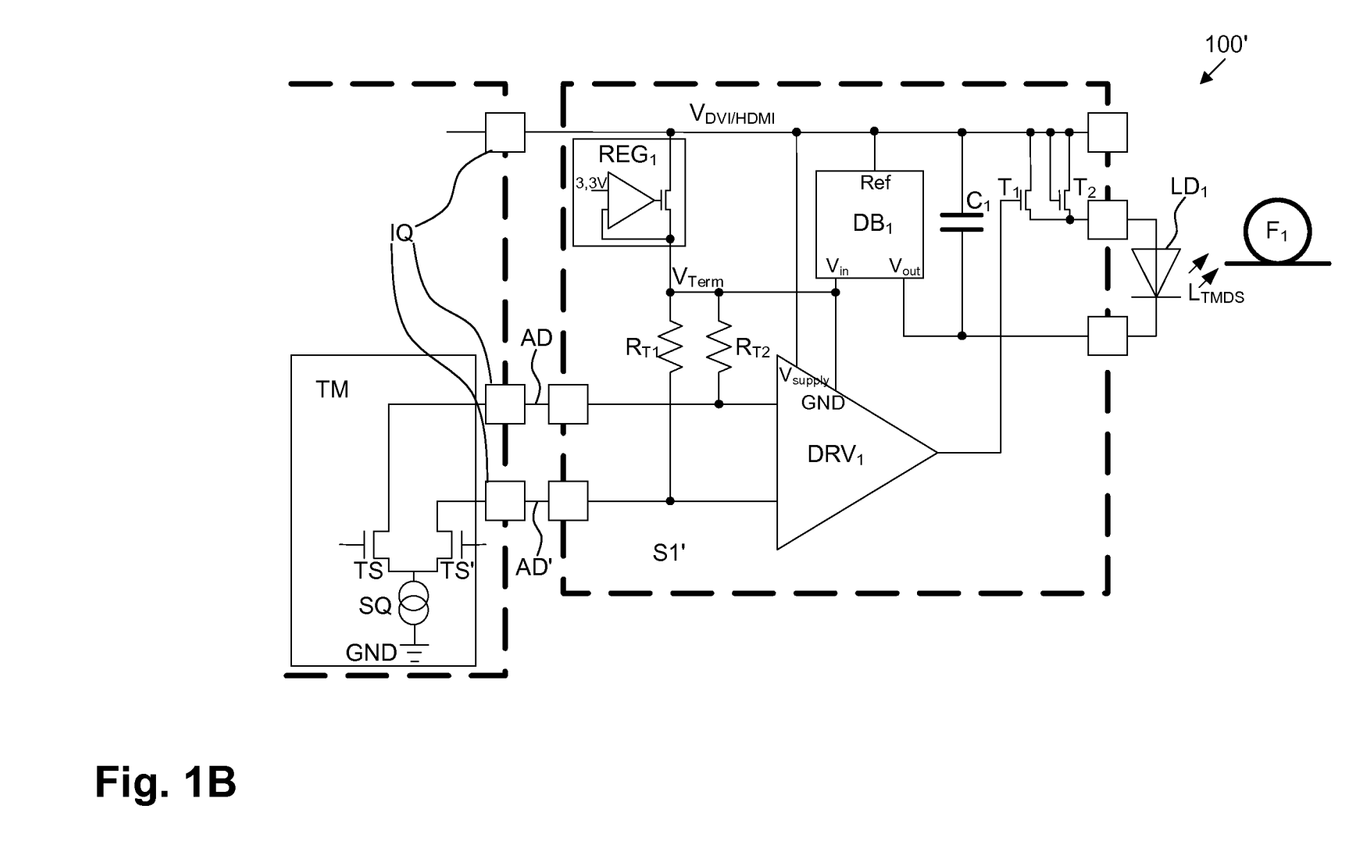
FIG. 1B in a conceptual schematic view a second exemplary embodiment of the first part, namely of the driver part, being implemented according to the present invention, of a circuit arrangement, wherein said driver part is operated according to the method of the present invention.
Figure 2A:
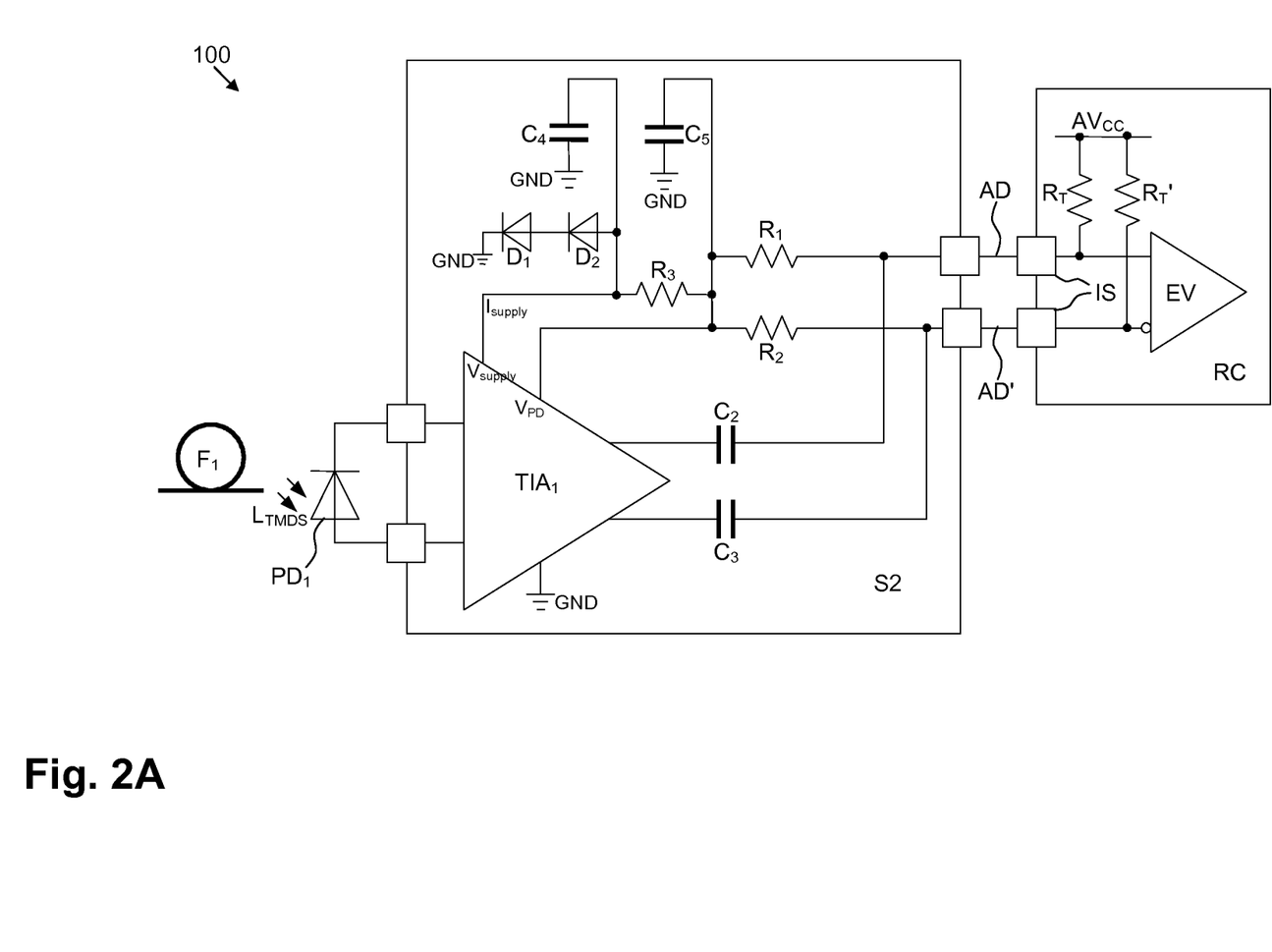
FIG. 2A in a conceptual schematic view a first exemplary embodiment of the second part, namely of the transimpedance converter part, being implemented according to the present invention, of a circuit arrangement, wherein said transimpedance converter part is operated according to the method of the present invention.
Figure 2B:
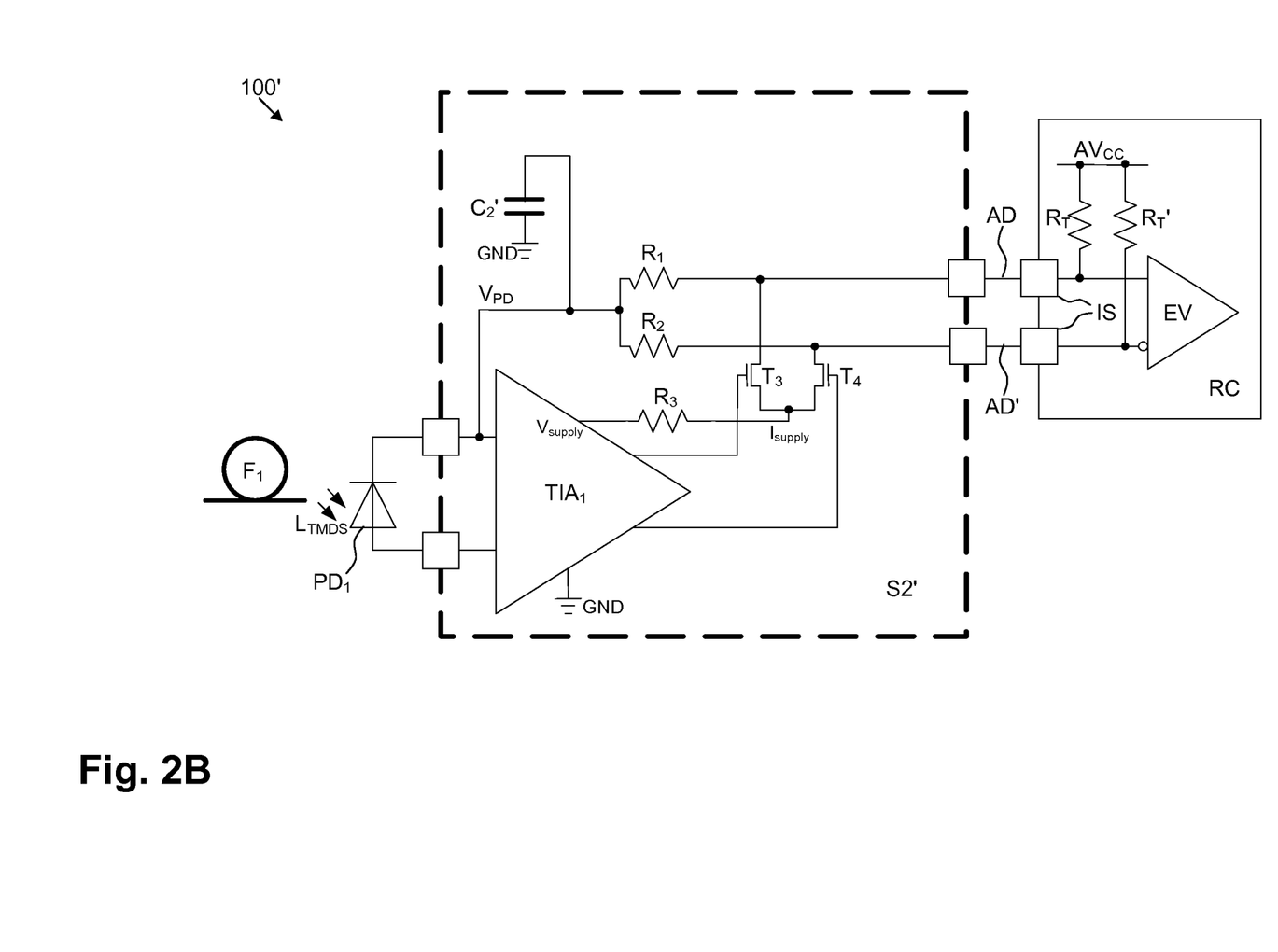
FIG. 2B in a conceptual schematic view a second exemplary embodiment of the second part, namely of the transimpedance converter part, being implemented according to the present invention, of a circuit arrangement, wherein said transimpedance converter part is operated according to the method of the present invention.

By means of the driver circuit S1 illustrated by FIG. 1A or of the driver circuit S1' illustrated by FIG. 1B according to the present invention, and by means of the transimpedance converter circuit S2 illustrated by FIG. 2A or of the transimpedance converter circuit S2' illustrated by FIG. 2B according to the present invention, which together define the circuit arrangement 100 (cf. FIG. 1A, FIG. 2A) or the circuit arrangement 100' (cf. FIG. 1B, FIG. 2B) according to the present invention (within the scope of the present invention, it is possible to implement and to operate the driver circuit S1, S1' and the transimpedance converter circuit S2, S2' independently of each other), it is basically possible to implement and to operate a cable-based connection without the necessity of any further electrical supply—apart from the electrical supply anyway already present at the electrical contacts—and thus to fit in at least one DVI and/or HDMI transmission channel of an active optical transmission cable without any difficulties, without the necessity of modifying the existing connection interface IQ of the data source and the existing connection interface IS of the data sink or without the necessity of operating these interfaces, IQ, IS beyond the specifications allowed for these interfaces, IQ, IS.

In a particularly preferred embodiment, all signals used for the image data transmission of a DVI and/or HDMI connection are transmitted in this way via optical channels from the DVI/HDMI source to the DVI/HDMI sink.

In order to avoid superfluous repetitions, the following explanations regarding the embodiments, features and advantages of the present invention—unless specified otherwise—relate to the first exemplary embodiment of the first part, namely of the driver part S1 of a circuit arrangement 100 according to the present invention, as shown in FIG. 1A, as well as to the second exemplary embodiment of the first part, namely of the driver part S1' of a circuit arrangement 100' according to the present invention, as shown in FIG. 1B.

In this connection, FIG. 1A or FIG. 1B show the principal setup of the driver S1 or S1' for the link with the connection interface IQ of the data source. This connection interface IQ of the data source provides a voltage supply VDVI/HDMI in the order of about five volt, said voltage supply VDVI/HDMI being able to supply up to about 55 milliampere.

This supply voltage VDVI/HDMI is fed to the driver S1 or S1', which comprises according to FIG. 1A a voltage-limiting element LT1, for example being implemented as parallel voltage regulator or shunt regulator, or according to FIG. 1B a voltage regulator REG1. Furthermore, the driver S1 or S1' comprises a voltage increasing circuit DB1, for example being implemented as voltage doubler and/or for example operating as direct voltage converter, terminating resistors RT1 and RT2, a decoupling capacitor C1, an input amplifier circuit DRV1 and a switching transistor T1. In addition, the second exemplary embodiment of the driver S1' according to FIG. 1B comprises a switching transistor T2 operating as source follower.

At least one light-emitting element LD1, for example at least one light diode, at least one light-emitting diode (=LED), at least one laser diode or at least one laser, such as at least one semiconductor laser, is connected to the driver circuit S1 or S1' [within the scope of the present invention, the term light or light-emitting is understood not only as the range of electromagnetic radiation visible to the eye, extending in a wavelength range from about 380 nanometers to about 780 nanometers which corresponds to a frequency of about 789 terahertz down to about 385 terahertz; rather, the term light or light-emitting is understood as the entire electromagnetic wavelength or frequency spectrum, including the spectrum not visible to the eye, in particular the I[nfra]R[ed] range (wavelength range up to about 2,000 nanometers or frequency range down to about 150 terahertz), for example a wavelength of about 850 nanometers or a frequency of about 350 terahertz].

The light-emitting element LD1 couples the light LTMDS being supplied with the data signal into an optical fiber F1. At the first exemplary embodiment of the driver S1 according to FIG. 1A, a defined potential difference or voltage difference VLT1 is generated by the voltage-limiting element LT1, with said potential difference or voltage difference VLT1 representing the input voltage for the voltage increasing circuit DB1; correspondingly, at the second exemplary embodiment of the driver S1' according to FIG. 1B, a defined termination voltage VTerm is generated by the voltage regulating element REG1, with said termination voltage VTerm representing the input voltage for the voltage increasing circuit DB1.

By means of the voltage increasing circuit DB1,
this potential difference or voltage difference VLT1 (cf. first exemplary embodiment of the driver S1 according to FIG. 1A) or
this termination voltage VTerm (cf. second exemplary embodiment of the driver S1' according to FIG. 1B) is raised to a voltage value necessary for operating the light-emitting element LD1; for example, by means of the voltage increasing circuit DB1 this potential difference or voltage difference VLT1 or this termination voltage VTerm can be raised by approximately the factor 1.5 to a voltage of about 2.5 volt, with such voltage being necessary for operating the light-emitting element LD1.

The input terminal Vin of the voltage increasing circuit DB1 is supplied
with the potential difference or voltage difference VLT1 (cf. first exemplary embodiment of the driver S1 according to FIG. 1A) or
with the termination voltage VTerm (cf. second exemplary embodiment of the driver S1' according to FIG. 1B); the output terminal Vout of the voltage increasing circuit DB1 is connected with the decoupling capacitor C1 and with the output terminal of the light-emitting element LD1; the reference terminal Ref of the voltage increasing circuit DB1 lies on supply voltage VDVI/HDMI; correspondingly, the driver circuit S1 or S1' uses the supply voltage VDVI/HDMI as reference point. It is ensured by the driver circuit S1 or S1' that the direct current portion, as provided from a TMDS transmitter TM, is used for the current supply of the light-emitting element LD1. By means of the input amplifier DRV1 and of the switching transistor T1, the current flow through the light-emitting element LD1 is modulated in dependence on the differential output signal of the TMDS transmitter TM.

The gate or the base of the switching transistor T1 is connected with the output terminal of the amplifier DRV1. The drain or the collector of the switching transistor T1 is assigned to the supply voltage VDVI/HDMI; in particular, the drain or the collector of the switching transistor T1 lies essentially on supply voltage VDVI/HDMI. The source or the emitter of the switching transistor T1 is connected with the input terminal of the light-emitting element LD1.

At the second exemplary embodiment of the driver S1' according to FIG. 1B, it is ensured by the transistor T2 operating as source follower that a minimum voltage is always applied to the light-emitting element LD1 also during the phases in which the first transistor T1 is off. By this technical measure, a reduction of the switching-on delay of the light-emitting element LD1 can be obtained whereby high signal frequencies are transmittable by the light-emitting element LD1. The gate or the base of the second switching transistor T2 is assigned to the supply voltage VDVI/HDMI; in particular, the gate or the base of the second switching transistor T2 can be chosen slightly differing from the supply voltage VDVI/HDMI in order to accomplish an optimization as to the most advantageous operating point of the light-emitting element LD1. The drain or the collector of the second switching transistor T2 is assigned to the supply voltage VDVI/HDMI; in particular, the drain or the collector of the second switching transistor T2 lies essentially on supply voltage VDVI/HDMI. The source or the emitter of the second switching transistor T2 is connected with the source or the emitter of the switching transistor T1 and with the input terminal of the light-emitting element LD1.

For the correct adjustment of the operating point of the output stage of the TMDS transmitter TM, the differential output of which is connected downstream of two transistors TS, TS' which are connected with respect to each other in a mirror-like way, the TMDS transmitter TM is supplied with the difference between potential difference or voltage difference VLT1 and voltage supply VDVI/HDMI at the first exemplary embodiment of the driver circuit S1 according to FIG. 1A or the output voltage VTerm of the voltage regulator REG1 at the second exemplary embodiment of the driver circuit S1' according to FIG. 1B by the terminating resistors RT1, RT2 being provided for the purpose of the at least partial termination of the differential connection line AD, AD'.

The first terminating resistor RT1 is connected between the input terminal of the voltage-limiting element LT1 (cf. first exemplary embodiment of the driver S1 according to FIG. 1A) or of the voltage regulator REG1 (cf. second exemplary embodiment of the driver S1' according to FIG. 1B) and a first input terminal of the amplifier circuit DRV1; the second terminating resistor RT2 is connected between the input terminal of the voltage-limiting element LT1 (cf. first exemplary embodiment of the driver S1 according to FIG. 1A) or of the voltage regulator REG1 (cf. second exemplary embodiment of the driver S1' according to FIG. 1B) and a second input terminal of the amplifier circuit DRV1.

In order to avoid superfluous repetitions, the following explanations regarding the embodiments, features and advantages of the present invention—unless specified otherwise—relate to the first exemplary embodiment of the second part, namely of the transimpedance converter part S2 of the circuit arrangement 100 according to the present invention, as shown in FIG. 2A, as well as to the second exemplary embodiment of the second part, namely of the transimpedance converter part S2' of the circuit arrangement 100' according to the present invention, as shown in FIG. 2B.

FIG. 2A or FIG. 2B show the basic setup of the transimpedance converter S2 or S2' for the link with the connection interface IS of the data sink. This connection interface IS of the data sink has no explicit voltage supply which could supply the necessary energy to the transimpedance converter S2 or S2'.

However, in case of a galvanic connection between data source and data sink, the TMDS receiver RC of the connection interface IS of the data sink effects that the TMDS transmitter TM is correctly terminated and that the necessary operating voltage is supplied to the output stage of the TMDS transmitter TM via the differential pair of wires AD, AD' between data source and data sink; in particular, the transimpedance converter circuit S2 or S2' is supplied by the direct voltage portion being applied to the differential pair of wires AD, AD'. This is used by the transimpedance converter circuit S2 or S2' comprising an amplifier TIA1 and resistors R1, R2, R3. In addition, the first exemplary embodiment of the transimpedance converter circuit S2 according to FIG. 2A comprises coupling capacitors C2 and C3, decoupling capacitors C4 and C5 and silicon diodes D1 and D2 connected in series to each other, whereas the second exemplary embodiment of the transimpedance converter circuit S2' according to FIG. 2B comprises a pair of switching transistors T3, T4 and a decoupling capacitor C2'.

In case of a galvanic connection between data source and data sink, the TMDS receiver RC of the connection interface IS of the data sink supplies an operating voltage AVCC in the order of about 3.3 volt, said operating voltage AVCC being able to supply up to about twelve milliampere per differential input and said supplying of the operating voltage AVCC being effected by internal ohmic terminating resistors RT, RT' connected in parallel at the differential input of the TMDS receiver RC.

Simultaneously, the input signal voltage required for the input amplifier EV is generated at the termination RT, RT' in the TMDS receiver RC referenced to this operating voltage AVCC. Being connected to the differential input of the TMDS receiver RC, the transimpedance converter part S2 or S2' generates for the TMDS receiver RC the VCM or common mode voltage required for the adjustment of the correct operating point, with said VCM or common mode voltage being generated from the correspondingly supplied operating voltage AVCC by the (terminating) resistors R1, R2 provided for the purpose of at least partial termination of the differential connection line AD, AD' (in this connection, the VCM or common mode voltage is a characteristic value of operational amplifiers or difference amplifiers, namely the mean value of the input voltages at the operational amplifier or difference amplifier).

At the first exemplary embodiment of the transimpedance converter circuit S2 according to FIG. 2A, this voltage is smoothed by the capacitor C5. Simultaneously, at the first exemplary embodiment of the transimpedance converter circuit S2 according to FIG. 2A, this voltage is provided to the amplifier TIA1 as supply voltage for the reverse voltage VPD of a photo diode PD1 assigned to the transimpedance converter S2.

At the first exemplary embodiment of the transimpedance converter circuit S2 according to FIG. 2A, furthermore the supply current Isupply feeding the supply voltage Vsupply flows at least partially via the first (terminating) resistor R1 or via the second (terminating) resistor R2 from the differential pair of wires AD, AD' to the amplifier TIA1. Basically, the current from the output stage is used as operating current or supply current Isupply of the amplifier TIA1.

At the first exemplary embodiment of the transimpedance converter circuit S2 according to FIG. 2A, the voltage is conducted from this circuit node point via the series resistor R3 to the two silicon diodes D1, D2. At the first exemplary embodiment of the transimpedance converter circuit S2 according to FIG. 2A, the correct operating voltage Vsupply of about 1.4 volt for the amplifier TIA1 is generated at the node point R1, D2, C4 by the voltage drop typical for a silicon diode D1, D2, with the differential input of the amplifier TIA1 being assigned to the light-absorbing element PD1. This voltage is smoothed by means of the decoupling capacitor C4.

Via the two coupling capacitors C2 and C3 (cf. first exemplary embodiment of the transimpedance converter circuit S2 according to FIG. 2A) or via the two switching transistors T3 and T4 (cf. second exemplary embodiment of the transimpedance converter circuit S2' according to FIG. 2B), the signal coming from the connected photo diode PD1 and being amplified by means of the amplifier TIA1 is provided to the differential input of the TMDS receivers RC.

At the first exemplary embodiment of the transimpedance converter circuit S2 according to FIG. 2A, the first coupling capacitor C2 is assigned to the first output of the amplifier TIA1; the second coupling capacitor C3 is assigned to the second output of the amplifier TIA1.

At the second exemplary embodiment of the transimpedance converter circuit S2' according to FIG. 2B, the first switching transistor T3 is assigned to the first output of the amplifier TIA1; the second switching transistor T4 is assigned to the second output of the amplifier TIA1, which provides the inversely to the first output of the amplifier TIA1 phased signal of the differential output signal.

Specifically, at the second exemplary embodiment of the transimpedance converter circuit S2' according to FIG. 2B, the gate or the base of the first switching transistor T3 is connected with the first output terminal of the amplifier TIA1; the drain or the collector of the first switching transistor T3 is assigned to the first (terminating) resistor R1; the source or the emitter of the first switching transistor T3 lies via the series resistor R3 on operating voltage or supply voltage Vsupply for the amplifier TIA1.

Furthermore, at the second exemplary embodiment of the transimpedance converter circuit S2' according to FIG. 2B, the gate or the base of the second switching transistor T4 is connected with the second output terminal of the amplifier TIA1; the drain or the collector of the second switching transistor T4 is assigned to the second (terminating) resistor R2; the source or the emitter of the second switching transistor T4 is connected with the source or emitter of the first switching transistor T3 and lies via the series resistor R3 on operating voltage or supply voltage Vsupply for the amplifier TIA1. At the second exemplary embodiment of the transimpedance converter circuit S2' according to FIG. 2B, by the switching of the T3 and T4 the supply current Isupply of the amplifier TIA1 is alternately taken either from the first wire AD or from the second wire AD' such that this supply current Isupply is essentially used for modulating the output voltage of the differential pair of wires AD, AD' in dependence on the incoming optical signal.

At the second exemplary embodiment of the transimpedance converter circuit S2' according to FIG. 2B, correspondingly the supply current Isupply is at least partially the current flowing through the pair of switching transistors T3, T4, with said supply current Isupply feeding the supply voltage Vsupply of the amplifier TIA1. Basically, the current from the output stage is used as operating current or supply current Isupply of the amplifier TIA1.

The electrical power required for operating the transimpedance converter circuit S2 or S2' is taken from the power, which is the product of the direct current portion in the connection between the transimpedance converter circuit S2 or S2' and the TMDS receiver RC and of the direct voltage portion at the TMDS receiver RC.

The electrical power for operating the amplifier TIA1 of the transimpedance converter circuit S2 or S2' is taken from that electrical power, which is the product of the direct current portion in the connection between the transimpedance converter circuit S2 or S2' and the TMDS receiver RC and of the potential difference or voltage difference between the node voltage at the output of the TMDS transmitter TM and the voltage supply also available at the TMDS interface in the order of about three volt.

LIST OF REFERENCE NUMERALS 100 circuit arrangement (=first exemplary embodiment; cf. FIG. 1A, FIG. 2A)
100' circuit arrangement (=second exemplary embodiment; cf. FIG. 1B, FIG. 2B)
AD first wire of differential pair of wires AD, AD'
AD' second wire of differential pair of wires AD, AD'
AVCC operating voltage or supply voltage
C1 decoupling capacitor of driver circuit S1, S1'
C2 first coupling capacitor of transimpedance converter circuit S2
C2' decoupling capacitor of transimpedance converter circuit S2'
C3 second coupling capacitor of transimpedance converter circuit S2
C4 first decoupling capacitor of transimpedance converter circuit S2
C5 second decoupling capacitor of transimpedance converter circuit S2
D first switch of output current driver or transmitter TM (=prior art example; cf. FIG. 3)
D' second switch of output current driver or transmitter TM (=prior art example; cf. FIG. 3)
D1 first silicon diode of transimpedance converter circuit S2
D2 second silicon diode of transimpedance converter circuit S2
DB1 voltage increasing circuit, in particular voltage doubler, of driver circuit S1, S1'
DRV1 amplifier circuit, in particular input amplifier, of driver circuit S1, S1'
EV amplifier circuit, in particular input amplifier, of receiver RC
F1 optical fiber, in particular glass fiber or plastic material fiber, for example plastic fiber, between data source and data sink
GND earth potential or ground potential or zero potential
IQ connection interface, in particular DVI/HDMI connection interface, assigned to data source
IS connection interface, in particular DVI/HDMI connection interface, assigned to data sink
Isupply operating current or supply current for amplifier TIA1
KK transmission channel, in particular copper cable, between data source and data sink
(=prior art example; cf. FIG. 3)

LTMDS light, provided with TMDS encoded signal
LD1 light-emitting element, in particular light diode, light-emitting diode, laser diode or laser, for example semiconductor laser, assigned to driver circuit S1, S1'
LT1 voltage-limiting element, in particular parallel voltage regulator or shunt regulator, of driver circuit S1
PD1 light-absorbing element, in particular photodiode, assigned to transimpedance converter circuit S2, S2'
R1 first, in particular ohmic, resistor, for example first terminating resistor, of transimpedance converter circuit S2, S2'
R2 second, in particular ohmic, resistor, for example second terminating resistor, of transimpedance converter circuit S2, S2'
R3 third, in particular ohmic, resistor, for example series resistor, of transimpedance converter circuit S2, S2'
RC receiver, in particular TMDS receiver
Ref reference terminal of voltage increasing circuit DB1
REG1 voltage regulating element or voltage regulator of driver circuit S1'
RT first, in particular ohmic, terminating resistor of receiver RC
RT' second, in particular ohmic, terminating resistor of receiver RC
RT1 first, in particular ohmic, terminating resistor of driver circuit S1, S1'
RT2 second, in particular ohmic, terminating resistor of driver circuit S1, S1'
S1 driver circuit or driver (=first exemplary embodiment; cf. FIG. 1A)
S1' driver circuit or driver (=second exemplary embodiment; cf. FIG. 1B)
S2 transimpedance converter circuit or transimpedance converter (=first exemplary embodiment; cf. FIG. 2A)
S2' transimpedance converter circuit or transimpedance converter (=second exemplary embodiment; cf. FIG. 2B)
SQ current source of output current driver or transmitter TM
T1 switching transistor, in particular first switching transistor, of driver circuit S1, S1'
T2 second switching transistor, in particular source follower, of driver circuit S1'
T3 first switching transistor of transimpedance converter circuit S2'
T4 second switching transistor of transimpedance converter circuit S2'
TIA1 amplifier circuit or amplifier of transimpedance converter circuit S2, S2'
TM output current driver, in particular TMDS output current driver, or transmitter, in particular TMDS transmitter
TS first transistor of output current driver or transmitter TM
TS' second, in particular in mirror-like way with respect to first transistor TS connected, transistor of output current driver or transmitter TM
VDVI/HDMI supply voltage, in particular of about five volt
Vin potential or voltage of input terminal of voltage increasing circuit DB1
VLT1 potential difference or voltage difference, defined by voltage-limiting element LT1
Vout potential or voltage of output terminal of voltage increasing circuit DB1
VPD reverse voltage of light-absorbing element PD1
Vsupply operating voltage or supply voltage for amplifier TIA1
VTerm termination potential or termination voltage, defined by voltage regulating element or voltage regulator REG1
Z0 impedance of differential pair of wires AD, AD' of copper cable KK
(=prior art example; cf. FIG. 3)

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. A circuit arrangement for transmitting signals from at least one data source to at least one data sink, said signals being TMDS encoded at least in part, wherein said circuit arrangement comprises:
   at least one driver circuit
      being connected downstream of at least one connection interface, which is assigned to the data source, and being suppliable by said connection interface with a supply voltage, and
      being connected upstream of at least one light-emitting element, said light-emitting element being provided for electro-optically converting the electrical TMDS encoded signals, wherein light being supplied with the TMDS encoded signals is coupleable into at least one optical fiber by means of said light-emitting element, and
   at least one transimpedance converter circuit
      being connected downstream of at least one light-absorbing element, said light-absorbing element being provided for opto-electrically converting the light being supplied with the TMDS encoded signals, wherein the light being supplied with the TMDS encoded signals is coupleable out from the optical fiber by means of said light-absorbing element,
      being connected upstream of at least one connection interface being assigned to the data sink, and
      being suppliable by a direct voltage portion being applied to at least one differential pair of wires,
   the at least one driver circuit including at least one voltage increasing circuit, by means of which voltage increasing circuit electrical energy can be taken and/or given from a
   potential difference or voltage difference, or
   termination voltage.

2. The circuit arrangement according to claim 1, wherein the electrical energy
   can be taken in that the voltage increasing circuit charges the potential difference or voltage difference or the termination voltage with current flowing and being directed such that the current tries to reduce the potential difference or voltage difference or the termination voltage, and/or
   can be given in that the voltage increasing circuit supplies a higher potential difference or voltage difference between the reference terminal of the voltage increasing circuit and the potential or the voltage of the output terminal of the voltage increasing circuit with current flowing and being directed such that the current tries to increase the higher potential difference or voltage difference, wherein the light-emitting element is operated with said higher potential difference or voltage difference.

3. The circuit arrangement according to claim 2, wherein, for at least partially terminating the differential pair of wires, the driver circuit comprises
- at least one first terminating resistor being connected between the input terminal of a voltage-limiting element or of a voltage regulating element or voltage regulator and a first input terminal of an amplifier circuit, and
- at least one second terminating resistor being connected between the input terminal of a voltage-limiting element or of a voltage regulating element or voltage regulator and a second input terminal of an amplifier circuit by means of which terminating resistors a TMDS transmitter can be supplied with the difference between potential difference or voltage difference and supply voltage or with the termination voltage, in order to adjust the operating point of the output stage of the TMDS transmitter.

4. The circuit arrangement according to claim 2, wherein the driver circuit comprises at least one amplifier circuit and at least one switching transistor for modulating the current flowing through the light-emitting element,
- wherein the gate or the base of the switching transistor is connected with the output terminal of the amplifier circuit,
- wherein the drain or the collector of the switching transistor is assigned to the supply voltage,
- wherein the source or the emitter of the switching transistor is connected with the input terminal of the light-emitting element.

5. A method for transmitting signals from at least one data source to at least one data sink, said signals being TMDS encoded at least in part,
- wherein a driver circuit is supplied by at least one connection interface, which is connected upstream and which is assigned to the data source, with a supply voltage,
- wherein the electrical TMDS encoded signals are electro-optically converted by means of at least one light-emitting element connected downstream of the driver circuit and are coupled into at least one optical fiber as light being supplied with the TMDS encoded signals,
- wherein the direct current portion supplied from at least one TMDS transmitter to the connection interface, which is assigned to the data source, is converted by means of the driver circuit to a modulated signal current for controlling the light-emitting element,
- wherein the light being supplied with the TMDS encoded signals is coupled out from the optical fiber by means of at least one light-absorbing element, is opto-electrically converted and is supplied to at least one transimpedance converter circuit, which is connected downstream of the light-absorbing element and upstream of at least one connection interface being assigned to the data sink, the transimpedance converter circuit being supplied by a direct voltage portion being applied to at least one differential pair of wires,
- the TMDS transmitter being terminated by means of at least one TMDS receiver of the connection interface being assigned to the data sink,
- an operating voltage being supplied to the TMDS transmitter via the differential pair of wires between the data source and the data sink,
- the driver circuit being supplied by the connection interface, which is assigned to the data source, with a supply voltage,
- the transimpedance converter circuit being supplied by means of at least two terminating resistors of the TMDS receiver with an operating voltage.

6. A circuit arrangement for transmitting signals from at least one data source to at least one data sink, said signals being TMDS encoded at least in part, wherein said circuit arrangement comprises:
- at least one driver circuit
  - being connected downstream of at least one connection interface, which is assigned to the data source, and being suppliable by said connection interface with a supply voltage, and
  - being connected upstream of at least one light-emitting element, said light-emitting element being provided for electro-optically converting the electrical TMDS encoded signals, wherein light being supplied with the TMDS encoded signals is coupleable into at least one optical fiber by means of said light-emitting element, and
- at least one transimpedance converter circuit
  - being connected downstream of at least one light-absorbing element, said light-absorbing element being provided for opto-electrically converting the light being supplied with the TMDS encoded signals, wherein the light being supplied with the TMDS encoded signals is coupleable out from the optical fiber by means of said light-absorbing element,
  - being connected upstream of at least one connection interface being assigned to the data sink, and
  - being suppliable by a direct voltage portion being applied to at least one differential pair of wires,
- the at least one driver circuit including at least one amplifier circuit and at least one switching transistor for modulating the current flowing through the light-emitting element,
  - wherein the gate or the base of the switching transistor is connected with the output terminal of the amplifier circuit,
  - wherein the drain or the collector of the switching transistor is assigned to the supply voltage,
  - wherein the source or the emitter of the switching transistor is connected with the input terminal of the light-emitting element.

7. The circuit arrangement according to claim 6, wherein the driver circuit comprises at least one second switching transistor,
- wherein the gate or the base of the second switching transistor is assigned to the supply voltage,
- wherein the drain or the collector of the second switching transistor is assigned to the supply voltage,
- wherein the source or the emitter of the second switching transistor is connected with the source or the emitter of the first switching transistor and with the input terminal of the light-emitting element.

8. A circuit arrangement for transmitting signals from at least one data source to at least one data sink, said signals being TMDS encoded at least in part, wherein said circuit arrangement comprises:
- at least one driver circuit
  - being connected downstream of at least one connection interface, which is assigned to the data source, and being suppliable by said connection interface with a supply voltage, and
  - being connected upstream of at least one light-emitting element, said light-emitting element being provided for electro-optically converting the electrical TMDS encoded signals, wherein light being supplied with the TMDS encoded signals is coupleable into at least one optical fiber by means of said light-emitting element, and at least one transimpedance converter circuit being connected downstream of at least one light-absorbing element, said light-absorbing element being provided for opto-electrically converting the light being supplied with the TMDS encoded signals, wherein the light being supplied with the TMDS encoded signals is coupleable out from the optical fiber by means of said light-absorbing element, being connected upstream of at least one connection interface being assigned to the data sink, and being suppliable by a direct voltage portion being applied to at least one differential pair of wires, wherein, for at least partially terminating the differential pair of wires, the at least one driver circuit including at least one first terminating resistor being connected between the input terminal of a voltage-limiting element or of a voltage regulating element or voltage regulator and a first input terminal of an amplifier circuit, and at least one second terminating resistor being connected between the input terminal of the voltage-limiting element or of the voltage regulating element or voltage regulator and a second input terminal of the amplifier circuit by means of which terminating resistors a TMDS transmitter can be supplied with the difference between potential difference or voltage difference and supply voltage or with the termination voltage, in order to adjust the operating point of the output stage of the TMDS transmitter.

9. A circuit arrangement for transmitting signals from at least one data source to at least one data sink, said signals being TMDS encoded at least in part, wherein said circuit arrangement comprises:

at least one driver circuit being connected downstream of at least one connection interface, which is assigned to the data source, and being suppliable by said connection interface with a supply voltage, and being connected upstream of at least one light-emitting element, said light-emitting element being provided for electro-optically converting the electrical TMDS encoded signals, wherein light being supplied with the TMDS encoded signals is coupleable into at least one optical fiber by means of said light-emitting element, and at least one transimpedance converter circuit being connected downstream of at least one light-absorbing element, said light-absorbing element being provided for opto-electrically converting the light being supplied with the TMDS encoded signals, wherein the light being supplied with the TMDS encoded signals is coupleable out from the optical fiber by means of said light-absorbing element, being connected upstream of at least one connection interface being assigned to the data sink, and being suppliable by a direct voltage portion being applied to at least one differential pair of wires, a TMDS transmitter being terminable by means of at least one TMDS receiver, which is assigned to the connection interface being assigned to the data sink, with the transimpedance converter circuit being connected to the differential input of the TMDS receiver, the transimpedance converter circuit is suppliable by means of at least two terminating resistors of the TMDS receiver with an operating voltage, and said an operating voltage is suppliable to the TMDS transmitter via the differential pair of wires.

10. The circuit arrangement according to claim 9, wherein the transimpedance converter circuit comprises at least one amplifier, the differential input of which is assigned to the light-absorbing element, and at least one first coupling capacitor being assigned to the first output of the amplifier, and at least one second coupling capacitor being assigned to the second output of the amplifier, for charging the differential input of the TMDS receiver with the TMDS encoded signals being taken up from the light-absorbing element and being amplified by means of the amplifier.

11. The circuit arrangement according to claim 9, wherein the transimpedance converter circuit comprises at least one amplifier, the differential input of which is assigned to the light-absorbing element, and at least one first switching transistor being assigned to the first output of the amplifier, and at least one second switching transistor being assigned to the second output of the amplifier, for charging the differential input of the TMDS receiver with the TMDS encoded signals being taken up from the light-absorbing element and being amplified by means of the amplifier, wherein the supply current of the amplifier, feeding the supply voltage, is at least partially the current flowing through the switching transistors.

12. A circuit arrangement for transmitting signals from at least one data source to at least one data sink, said signals being TMDS encoded at least in part, wherein said circuit arrangement comprises:

at least one driver circuit being connected downstream of at least one connection interface, which is assigned to the data source, and being suppliable by said connection interface with a supply voltage, and being connected upstream of at least one light-emitting element, said light-emitting element being provided for electro-optically converting the electrical TMDS encoded signals, wherein light being supplied with the TMDS encoded signals is coupleable into at least one optical fiber by means of said light-emitting element, and at least one transimpedance converter circuit being connected downstream of at least one light-absorbing element, said light-absorbing element being provided for opto-electrically converting the light being supplied with the TMDS encoded signals, wherein the light being supplied with the TMDS encoded signals is coupleable out from the optical fiber by means of said light-absorbing element, being connected upstream of at least one connection interface being assigned to the data sink, and being suppliable by a direct voltage portion being applied to at least one differential pair of wires, the transimpedance converter circuit including at least one amplifier, the differential input of which is assigned to the light-absorbing element, and at least one first coupling capacitor being assigned to the first output of the amplifier, and at least one second coupling capacitor being assigned to the second output of the amplifier, for charging the differential input of a TMDS receiver with the TMDS encoded signals being taken up from the light-absorbing element and being amplified by means of the amplifier.

13. The circuit arrangement according to claim 12, wherein, for at least partially terminating the differential pair of wires, the transimpedance converter circuit comprises at least one first resistor, and
at least one second resistor,
by means of which resistors the operating point of the input stage of the TMDS receiver can be adjusted by means of generating a common mode voltage for the TMDS receiver from the operating voltage, and
wherein the supply current, feeding the supply voltage, flows at least partially via the first resistor and/or via the first resistor from the differential pair of wires to the amplifier.

14. A circuit arrangement for transmitting signals from at least one data source to at least one data sink, said signals being TMDS encoded at least in part, wherein said circuit arrangement comprises:
at least one driver circuit
being connected downstream of at least one connection interface, which is assigned to the data source, and being suppliable by said connection interface with a supply voltage, and
being connected upstream of at least one light-emitting element, said light-emitting element being provided for electro-optically converting the electrical TMDS encoded signals, wherein light being supplied with the TMDS encoded signals is coupleable into at least one optical fiber by means of said light-emitting element, and
at least one transimpedance converter circuit
being connected downstream of at least one light-absorbing element, said light-absorbing element being provided for opto-electrically converting the light being supplied with the TMDS encoded signals, wherein the light being supplied with the TMDS encoded signals is coupleable out from the optical fiber by means of said light-absorbing element,
being connected upstream of at least one connection interface being assigned to the data sink, and
being suppliable by a direct voltage portion being applied to at least one differential pair of wires,
the transimpedance converter circuit including
at least one amplifier, the differential input of which is assigned to the light-absorbing element, and
at least one first switching transistor being assigned to the first output of the amplifier, and at least one second switching transistor being assigned to the second output of the amplifier, for charging the differential input of a TMDS receiver with the TMDS encoded signals being taken up from the light-absorbing element and being amplified by means of the amplifier, wherein the supply current of the amplifier, feeding the supply voltage, is at least partially the current flowing through the switching transistors.

15. The circuit arrangement according to claim 14, wherein, for at least partially terminating the differential pair of wires, the transimpedance converter circuit comprises
at least one first resistor, and
at least one second resistor, by means of which resistors the operating point of the input stage of the TMDS receiver can be adjusted by means of generating a common mode voltage for the TMDS receiver from the operating voltage.

16. A method for transmitting signals from at least one data source to at least one data sink, said signals being TMDS encoded at least in part,
wherein a driver circuit is supplied by at least one connection interface, which is connected upstream and which is assigned to the data source, with a supply voltage,
wherein the electrical TMDS encoded signals are electro-optically converted by means of at least one light-emitting element connected downstream of the driver circuit and are coupled into at least one optical fiber as light being supplied with the TMDS encoded signals,
wherein the direct current portion supplied from at least one TMDS transmitter to the connection interface, which is assigned to the data source, is converted by means of the driver circuit to a modulated signal current for controlling the light-emitting element,
wherein the light being supplied with the TMDS encoded signals is coupled out from the optical fiber by means of at least one light-absorbing element, is opto-electrically converted and is supplied to at least one transimpedance converter circuit, which is connected downstream of the light-absorbing element and upstream of at least one connection interface being assigned to the data sink, the transimpedance converter circuit being supplied by a direct voltage portion being applied to at least one differential pair of wires, and
wherein electrical energy for operating the transimpedance converter circuit is taken from that electrical energy, which is the product of the direct current portion in the connection between the transimpedance converter circuit and at least one TMDS receiver, which is assigned to the connection interface being assigned to the data sink, and of the direct voltage portion at the TMDS receiver.

17. The method according to claim 16, wherein
the TMDS transmitter is terminated by means of at least one TMDS receiver of the connection interface being assigned to the data sink,
an operating voltage is supplied to the TMDS transmitter via the differential pair of wires between the data source and the data sink,
the driver circuit is supplied by the connection interface, which is assigned to the data source, with a supply voltage,
the transimpedance converter circuit is supplied by means of at least two terminating resistors of the TMDS receiver with an operating voltage.

* * * * *